United States Patent [19]

Cameron et al.

[11] Patent Number: 4,591,494
[45] Date of Patent: May 27, 1986

[54] METHOD AND APPARATUS FOR MAKING SULPHURIC ACID

[75] Inventors: Gordon M. Cameron, North York; Edward G. C. Lyne, Scarborough, both of Canada

[73] Assignee: C-I-L, North York, Canada

[21] Appl. No.: 726,287

[22] Filed: Apr. 23, 1985

Related U.S. Application Data

[63] Continuation of Ser. No. 463,529, Feb. 3, 1983, abandoned.

[51] Int. Cl.⁴ .................. C01B 17/98; C01B 17/74; C01B 17/48
[52] U.S. Cl. .................. 423/522; 423/533; 422/161
[58] Field of Search ........... 423/522, 533, 535, 529; 422/160, 161

[56] References Cited

U.S. PATENT DOCUMENTS

| | | | |
|---|---|---|---|
| 3,432,264 | 3/1969 | Bostwick et al. | 423/533 |
| 3,536,446 | 10/1970 | Maurer | 423/522 |
| 3,752,884 | 8/1973 | Sasse | 423/522 |
| 3,818,088 | 6/1974 | Sasse | 423/522 |

FOREIGN PATENT DOCUMENTS

| | | | |
|---|---|---|---|
| 2703474 | 8/1978 | Fed. Rep. of Germany | 423/522 |
| 47-15445 | 5/1972 | Japan | 423/522 |

Primary Examiner—Gary P. Straub
Attorney, Agent, or Firm—Cushman, Darby & Cushman

[57] ABSTRACT

In a system using the double absorption process for sulphuric acid manufacture, a single acid circulation system and a single cooler are employed. Acid from the exit of the air drying tower is circulated to and flows through the final absorber where it absorbs the inlet $SO_3$ gas before joining with the acid from the intermediate absorber. The mixed stream is then cooled and split between the drying tower and the intermediate absorber. The circulation arrangement reduces the cooling to one relatively high temperature location, eliminates the transfer of $SO_2$ to the effluent gas from acid in the normal single system, and simplifies acid strength and level control.

7 Claims, 1 Drawing Figure

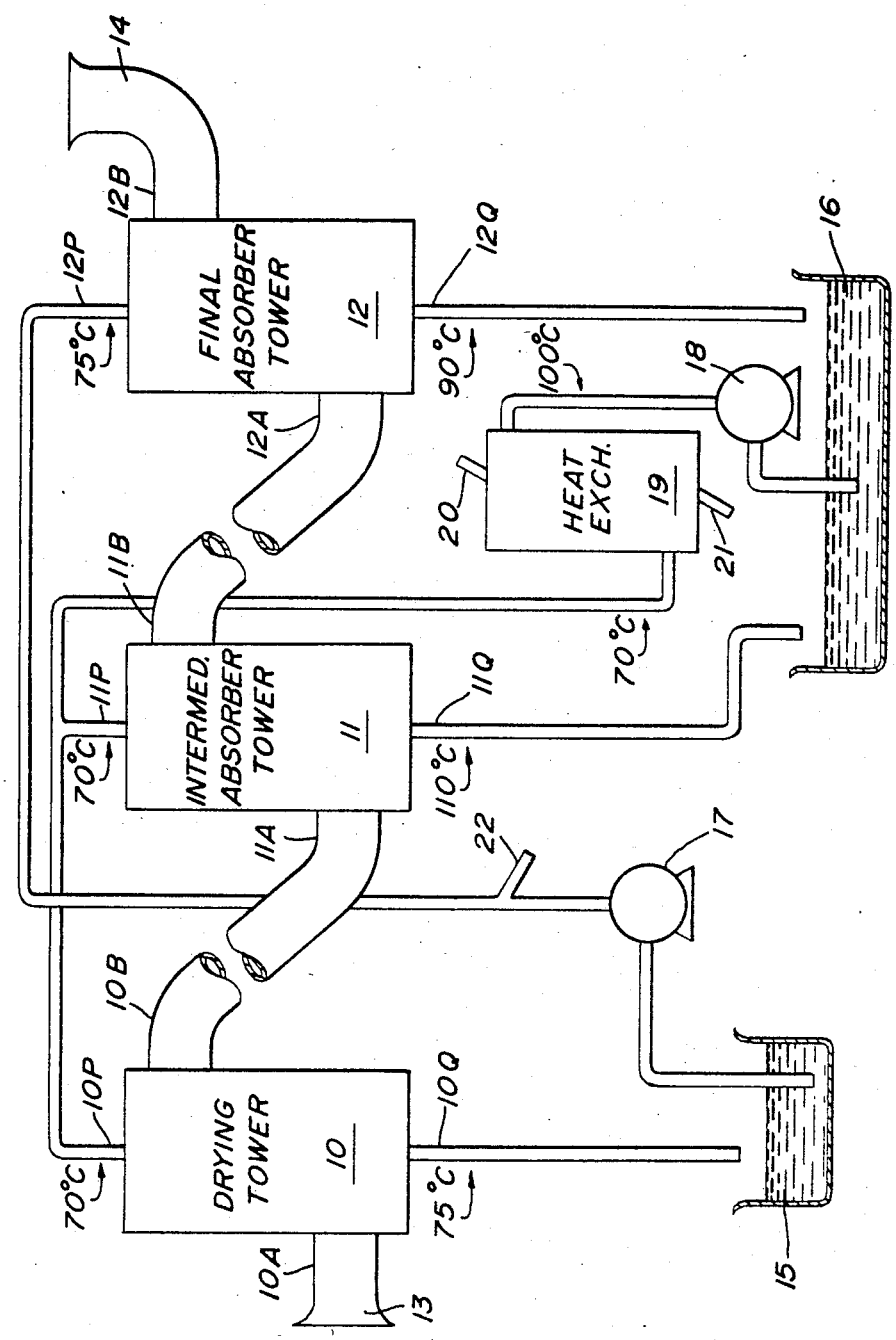

METHOD AND APPARATUS FOR MAKING SULPHURIC ACID

This is a continuation, of application Ser. No. 463,529, filed Feb. 3, 1983, which was abandoned upon the filing hereof.

This invention relates to the manufacture of sulphuric acid from sulphur by the double absorption process.

In the double absorption process for sulphuric acid manufacture in which sulphur is used as a feedstock, there are three operations in which the main gas stream is contacted with sulphuric acid and in which significant quantities of heat are evolved and must be removed from the acid. In the classical practice of the art, the system to carry out each such operation consists of a packed tower where gas flows upward through packing and contacts a large recirculating stream of acid into which the appropriate mass and heat are transferred, an acid reservoir with appropriate pumps to recirculate the acid stream, a cooler to remove the heat generated, and the associated acid transfer lines, water dilution lines, and instrumentation to regulate acid strength and inventory.

Drying of incoming air is the first of the three operations. Here, ambient air is contacted by acid to remove moisture. With air, the heat load (i.e. the heat evolved and to be removed) is typically low compared to that evolved in the other operations and is typically about 10% of the total heat load in the three operations. As will be shown later, the acid recirculating in the drying tower typically contains 93–96% $H_2SO_4$ and is normally in the temperature range 40°–70° C.

The second operation is the removal of $SO_3$ from the process gas leaving an intermediate stage of the conversion process. Typically, about 90% of the $SO_3$ formed in the process is removed in this step by contacting with hot 98% $H_2SO_4$ which is typically in the range 70°–110° C. The heat load in this operation is normally around 70% of the total heat load. This operation is normally referred to as intermediate absorption. The acid circulation required is high due to the heat evolution and mass transfer requirements.

The third operation is the removal of $SO_3$ from process gas leaving the last or final stage of the conversion process. Here, the remaining $SO_3$ formed in the process is removed by contact with a third recirculating stream of acid. The heat load is normally small compared to that produced in the intermediate absorption operation, representing at most 20% of the total heat evolution in the acid system.

With three separate systems for carrying out the above three operations, there is a need for acid strength regulation and inventory control in each system. Acid strength regulation is normally achieved by either cross-transfers of acid between systems and/or by water dilution as is appropriate while inventory is normally controlled by regulation of level in each of the systems. Acid circulation in each system is very large compared to the amount of $H_2O$ or $SO_3$ being picked up and is defined by the needs to irrigate the packing in the tower and to stay within appropriate temperature limits which are normally set by a need to avoid serious corrosion.

An improved acid system of lesser complexity known as the "mono" system has been developed in which the circulation systems associated with the drying and intermediate absorption operations are combined and acid from a common reservoir or pump tank is pumped through suitable coolers to the drying and intermediate absorption towers. Of necessity, the acid circulating in the drying system now is of 98% strength as this strength is required by the absorption operation and more dilute acid is normally generated by a separate acid dilution system. Three separate systems are still required however as the drying system has now been replaced by the dilution system and three levels still require regulation.

Both of the previous approaches discussed above require complex transfer lines, levels, and analyzers to regulate the acid inventory and control acid strength. A multiplicity of acid coolers (i.e. heat exchangers) are also needed to handle the large circulating acid flows. The overall result is an expensive plant which has many potential hazards and is complex to control.

One object of this invention is therefore to provide a simpler acid system for a double absorption plant.

A further object of the invention is to provide a system in which heat can be removed from the acid system at one point in the plant where the acid is relatively hot, minimizing the expense in the heat transfer equipment and allowing easier recovery of the associated energy for other uses.

In one of its aspects the invention provides apparatus for making sulphuric acid from sulphur, comprising a drying tower, an intermediate absorber tower, and a final absorber tower; each tower having an acid inlet and an acid outlet; wherein the apparatus includes means for conducting acid from said outlet of said drying tower to said inlet of said final absorber tower; and includes means for preventing acid from said outlet of said intermediate absorber tower from passing directly to said inlet of said final absorber tower.

In another of its aspects the invention provides in a double absorption process for manufacturing sulphuric acid, in which a gas stream flows through a drier to remove $H_2O$ therefrom, is used to burn sulphur to form $SO_2$ therein, a portion of the $SO_2$ then being converted to $SO_3$, the gas stream then passing through an intermediate absorber for removal of said $SO_3$ therefrom, essentially all of the remaining $SO_2$ in said gas stream then being converted to further $SO_3$, said gas stream then passing through a final absorber for removal of said further $SO_3$, said gas stream being contacted with sulphuric acid streams in said drier and in both said absorbers, the improvement comprising:

(a) flowing acid from said drier to said final absorber,
(b) joining the acid streams from said final absorber and said intermediate absorber together to form a combined acid stream,
(c) cooling said combined acid stream to form a cooled acid stream,
(d) and dividing said cooled acid stream and flowing a portion thereof to said drier and a portion thereof to said intermediate absorber.

Further objects and advantages of the invention will appear from the following description of an exemplary embodiment of the invention, with reference to the accompanying drawing which shows a schematic layout of sulphuric acid manufacturing apparatus.

The apparatus shown in the drawing includes three towers, namely a drying tower 10, an intermediate absorber tower 11, and a final absorber tower 12. Each of these towers has a gas inlet A at the bottom and a gas outlet B at the top. Each tower has an acid inlet P at the top, and an acid outlet Q at the bottom. Each tower is filled with packing through which the gas or air and acid percolate to produce a full and intimate contact therebetween.

The process gas circulation system of the apparatus follows normal practice. Air enters the apparatus through the intake 13, and passes to the drying tower 10 through inlet 10A. The air emerges at the outlet 10B in a moisture-free state. Sulphur is burned with the dry air in a sulphur burner (not shown) to produce sulphur dioxide. The process gas, which is now a mixture of air and sulphur dioxide, then passes through a catalytic converter (not shown) where the majority of the sulphur dioxide is converted into sulphur trioxide. The process gas, laden with $SO_3$ and unconverted $SO_2$, enters the intermediate absorber tower 11 through inlet 11A. The gas exits from outlet 11B, essentially all of the $SO_3$ having passed into the acid. The effluent gas from the intermediate absorber then passes through a second catalytic converter (not shown) where almost all of the $SO_2$ present is converted into $SO_3$. The effluent gas from the second converter then enters the final absorber tower 12, where the last remnants of $SO_3$ are absorbed by the acid circulating in tower 12. The gas finally exhausts to the atmosphere through a stack 14.

The acid outlets 10Q, 11Q, 12Q drain into reservoirs: acid from the drying tower 10 into first reservoir 15, and acid from the intermediate and final absorber towers into a second reservoir 16. A first pump 17 and a second pump 18 convey acid from the respective reservoirs 15, 16.

Acid drawn from the second reservoir 16 is pumped through a heat exchanger 19 which can physically be one or more heat exchanger units), where it is cooled by cooling water that circulates via conduits 20, 21 through the exchanger. The acid then travels to the acid inlets 10P, 11P of both the drying tower 10 and the intermediate tower 11. Acid from the drying tower 10 flows to the first reservoir 15. Acid from the first reservoir 15 is pumped directly to the acid inlet 12P of the final absorber tower. Acid product is drawn off through an outlet 22.

The acid draining from the intermediate absorber tower 11 is contaminated with dissolved $SO_2$. Therefore, the acid in the second reservoir 16 is also contaminated with $SO_2$. Thus, the acid entering the drying tower and the intermediate tower is also contaminated with $SO_2$. In the drying tower, atmospheric air contacts the contaminated acid. Not only does moisture pass from the air to the acid very readily in this tower, but the dissolved $SO_2$ also passes very readily to the dry air stream. Thus, the air in outlet 10B is virtually completely dry, while the acid in outlet 10Q is virtually completely free of $SO_2$. Therefore, the acid in the first reservoir 15 is virtually $SO_2$ free, and therefore the acid fed to the final absorber tower 12, through inlet 12P, is virtually $SO_2$-free. Thus, there is no stripping of $SO_2$ from the final absorber tower acid into the exhaust gases. This arrangement may be contrasted with previous arrangements in which the acid fed to the final absorber tower inlet 12P has been contaminated with $SO_2$ from the intermediate absorber tower 11. Such $SO_2$ has then be stripped from the acid in the final absorption tower by the gas stream therein, resulting in an increase in $SO_2$ in the effluent gas which is discharged to atmosphere.

The arrangement of the invention also gives rise to a benefit in the construction of the heat exchanger. In all the towers, the reactions produce heat, and therefore the acid emerges from the towers at a higher temperature than it entered the towers. The quantity of heat produced however is not the same in each tower. Of the total heat produced in the three towers, the drying tower 10 accounts, typically, for 10%; the intermediate absorber tower 11 for 70%; and the final absorber tower 12 for the remaining 20%. At the same time the requirements for proper contacting between gas and acid in the towers are such that the acid flows through the three towers are roughly in the proportion 1:2:1. A direct consequence of the two sets of data is that there is only a small change in temperature in the acid flowing through the drying tower 10 with a greater temperature rise in the case of the acid flowing through the final absorber 12 and an even larger rise in the case of the acid flowing through the intermediate absorber 11. The temperatures marked on the drawing are typical equilibrium temperatures that arise as a consequence of these exothermic reactions.

The acid in the intermediate absorber tower outlet 11Q is, as would be expected, the hottest, at 110° C. The second reservoir 16 receives both this acid, and the 90° C. acid from the final absorber tower outlet 12Q. The mixed acid from the reservoir 16 therefore enters the heat exchanger 19 at a temperature slightly hotter than, 100° C. To keep the acid in the intermediate tower 11 at a temperature at which the reaction is not unduly corrosive, the acid must be cooled to about 70° C. before it enters the intermediate tower. That temperature is well suited also for the acid entering the drying tower 10; and since the heat produced in the drying tower is relatively low, the acid emerges in the outlet 10Q at only slightly warmer than 75° C. At this temperature, the acid does not need to be cooled further prior to its entry into the final absorber tower 12, and it is still no hotter than 90° C. when it emerges from the final tower. Thus only one heat exchanger 19 need be provided with the arrangement of the invention. The single heat exchanger is also located where the acid is relatively hot. Thus, not only have three heat exchangers in the classic plant been replaced with a single heat exchanger, but also the single heat exchanger is located where the acid is at a relatively high temperature, facilitating heat removal and reducing the cost of the heat transfer system.

Not only does the arrangement of the apparatus as called for in the invention give rise to the benefits of a relatively inexpensive, efficient heat exchanger, but also it gives rise to a reduction in the amount of instrumentation needed to control the apparatus. All the acid passes at some stage through the second reservoir 16, since the acid circulation system may be regarded as linking the towers "in series". Therefore, just one set of temperature monitoring and control instruments, and one set of acid strength analysing and control instruments, are needed. These are preferably located so as to sample the acid in the second reservoir 16, since the acid here responds the earliest to changes in the sulphur strength in the sulphur burner (the most variable of the acid characterising factors). Any necessary water addition is made to the second reservoir 16.

A useful further benefit of the arrangement of the invention is that because the acid entering the final absorber tower has been warmed by its passage through the drying tower, the final absorber tower very quickly warms up from cold to its optimum working temperature. This is advantageous from the standpoint of acid quality but also tends to reduce sulphur trioxide contamination of the atmosphere on start-up, which can be a problem when the final absorber tower would otherwise be at low temperatures.

What we claim is:

1. Apparatus for making sulphuric acid from sulphur, comprising a drying tower, an intermediate absorber tower, and a final absorber tower; each tower having an acid inlet and an acid outlet; wherein the apparatus includes means for conducting the acid from said outlet of said drying tower to said inlet of said final absorber tower and means for preventing acid from said outlet of said intermediate absorber tower from passing directly to said inlet of said final absorber tower said last named means comprising means for feeding acid discharged from said outlets of both said final absorber tower and said intermediate absorber tower into a common reservoir; a heat exchanger; and a first pumping means for pumping acid from said common reservoir through said heat exchanger into said inlets of both said drying tower and said intermediate absorber tower and a second pumping means for pumping acid from said drying tower to said final absorber, the pumping capacities of said first pumping means and said second pumping means being in a ratio of about 3.1; such that the acid from said intermediate absorber tower passes through said drying tower and intermediate absorber via said reservoir and heat exchanger before passing through said final absorber tower.

2. Apparatus as claimed in claim 1, including means for feeding acid discharged from said outlet of said drying tower into a separate reservoir, said acid from said separate reservoir being conducted directly to said inlet of said final absorber tower.

3. Apparatus as claimed in claim 1, wherein substantially all the cooling that the acid that is fed into said inlets of both said drying tower and said intermediate absorber tower undergoes takes place in the said heat exchanger, 4. Apparatus as claimed in claim 3, wherein the acid discharged from said outlet of said drying tower is substantially not cooled before entering said inlet of said final absorber tower.

5. In a double absorption process for manufacturing sulphuric acid, in which a gas stream flows through a drier to remove $H_2O$ therefrom, is used to burn sulphur to form $SO_2$ therein, a portion of the $SO_2$ then being converted to $SO_3$, the gas stream then passing through an intermediate absorber for removal of said $SO_3$ therefrom, essentially all of the remaining $SO_2$ in said gas stream then being converted to further $SO_3$, said gas stream then passing through a final absorber for removal of said further $SO_3$, said gas stream being contacted with sulphuric acid streams in said drier and in both said absorbers, the improvement comprising:

(a) flowing acid from said drier directly to said final abosrber, (b) joining the acid streams from said final absorber and said intermediate absorber together to form a combined acid stream, (c) cooling said combined acid stream to form a cooled acid stream, (d) and dividing said cooled acid stream and flowing a portion thereof to said drier and a portion thereof to said intermediate abosrber, (e) while maintaining the acid supply to the drier, intermediate absorber and final absorber roughly in the proportion of 1:2:1.

6. The process according to claim 5 wherein the acid from said drier is substantially not cooled before entering said final absorber.

7. The process according to claim 5 wherein said acid leaves said drier and enters said final absorber at a temperature of about 75° C., acid leaves said intermediate absorber at a temperature of about 110° C., acid leaves said final absorber at a temperature of about 90° C., and wherein acid enters the drying tower and the intermediate absorber tower at a temperature of about 70° C.

* * * * *